[19] United States Patent
Kawai

[11] Patent Number: 4,743,791
[45] Date of Patent: May 10, 1988

[54] VIBRATION WAVE MOTOR
[75] Inventor: Tohru Kawai, Kawasaki, Japan
[73] Assignee: Canon Kabushiki Kaisha, Tokyo, Japan
[21] Appl. No.: 925,217
[22] Filed: Oct. 31, 1986
[30] Foreign Application Priority Data
Nov. 27, 1985 [JP] Japan ................................ 60-266785
[51] Int. Cl.⁴ ............................................ H01L 41/08
[52] U.S. Cl. .................................... 310/323; 310/328
[58] Field of Search ................................ 310/323, 328
[56] References Cited
U.S. PATENT DOCUMENTS
4,484,099 11/1984 Kawai et al. .................. 310/328 X
4,513,219 4/1985 Katsuma et al. ..................... 310/328
4,560,263 12/1985 Katsuma et al. ................ 310/328 X
4,562,374 12/1985 Sashida ................................ 310/328
4,629,039 12/1986 Imoto et al. ..................... 310/328 X FOREIGN PATENT DOCUMENTS
0670992 6/1979 U.S.S.R. ............................. 310/328

Primary Examiner—Mark O. Budd
Attorney, Agent, or Firm—Fitzpatrick, Cella, Harper & Scinto

[57] ABSTRACT

A vibration wave motor having a vibration member for generating a travelling vibration wave by applying a drive signal to an electro-mechanical energy transducer and a movable member displaced by the vibration wave, characterized in that the vibration member and the movable member are kept in press-contact by a dished spring.

7 Claims, 2 Drawing Sheets

VIBRATION WAVE MOTOR

BACKGROUND OF THE INVENTION

1. Field of the Invention

The present invention relates to a vibration wave motor which displaces a movable member such as a rotor by a vibration wave generated by an electro-mechanical energy transducer such as an electrostrictive element or piezoelectric element.

2. Related Background Art

A vibration wave motor which displaces a movable member by applying a travelling wave to the movable member frictionally engages with a vibration member on which an electostrictive element is arranged, the travelling wave being generated on the vibration member by applying a drive signal to the electrostrictive element, has been known by, for example, U.S. Pat. No. 4,484,099 (issued on Nov. 20, 1984) and U.S. application Ser. No. 561,550 (filed on Dec. 14, 1983).

In such a vibration wave motor, the movable member is press-contacted to the vibration member by a biasing member and the movable member is driven by a travelling vibration wave generated in the vibration member. In such a prior art motor, if a flexure of the biasing means varies for some reason, the pressure between the vibration member and the movable member changes and a characteristic of the motor changes.

SUMMARY OF THE INVENTION

It is an object of the present invention to provide a vibration wave motor whose characteristics do not change even if a flexuring force of a biasing member changes.

Other objects of the present invention will be apparent from the following detailed description of the invention.

In the present invention, in order to achieve the above object, a dished spring serves as a member for applying a pressure between the movable member and the vibration member.

DETAILED DESCRIPTION OF THE PREFERRED EMBODIMENTS

Various types of vibration wave motors which drive the vibration member by the vibration wave generated by the electrostrictive element which serves as the electro-mechanical energy transducer have been known. In the following embodiment, a travelling wave is generated in a vibration member having an electrostrictive element attached thereto and a movable member is driven by the travelling wave. It is applied to a one-eye reflex camera lens.

Figure 1:
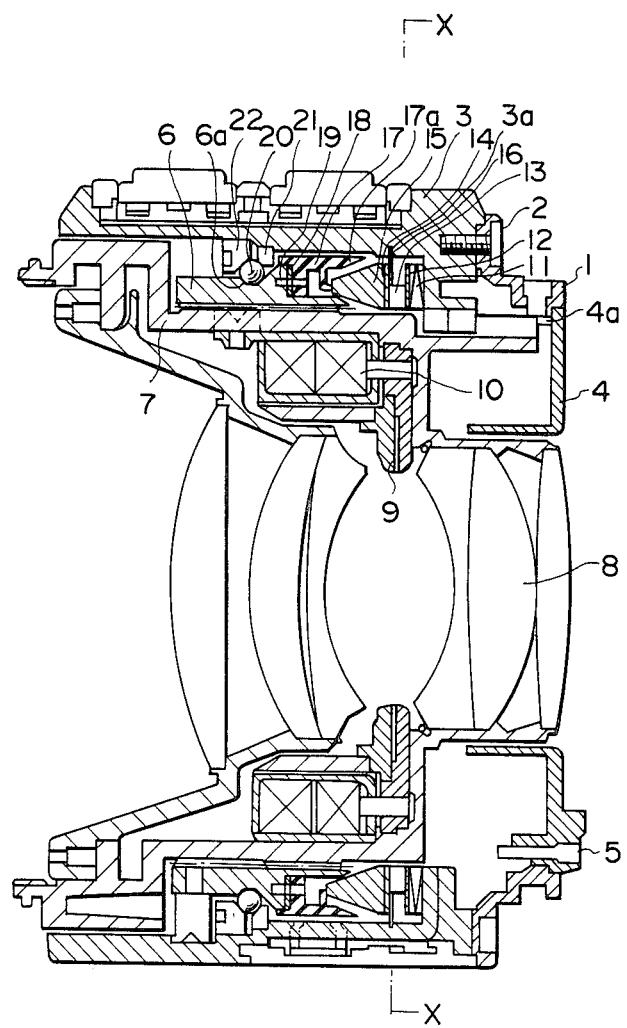
FIG. 1 shows a sectional view of a lens body tube to which a vibration wave motor of the present invention is applied.

FIG. 1 shows a construction of a lens for a one-eye reflex type camera to which the vibration wave motor is applied. Numeral 1 denotes a mount attached to a lens mount of a camera body (not shown). Numeral 2 denotes a fixing screen, numeral 3 denotes a stationary tube coupled to the mount 1 and the fixing screen 2, numeral 4 denotes a rear lid resiliently coupled to the mount 1 by a resilient member 4a, numeral 5 denotes a group of contacts for exchanging signals with the camera body, numeral 6 denotes a rotary tube having a rotary helicoid screw driven by a vibration wave motor, and numeral 7 denotes a straight tube meshed with the rotary helicoid screw.

With the rotary tube 6 is driven by the vibration wave motor, a lens system 8 in the straight tube 7 is driven so that lens system focus is adjusted. The straight tube 7 has an iris unit 9 which is driven with the lens system 8. Numeral 11 denotes a dished spring which frictionally contacts a vibration member to a movable member. It is inserted in the stationary tube 3. The dished spring 11 presses the vibration member 15 made of resilient material toward a movable member, i.e. rotor 17 through a washer 12, a felt piece 13 which serves as a vibration absorber and the electrostrictive element which serves as the electro-mechanical energy transducer attached on the back side of the vibration member 15. The electro-strictive elements 14 are phase-differentially arranged in a known manner. The elements 14 may be phase-differentially polarized. Terminals 16 are connected to the electrostrictive element 14 attached to the ring-shaped vibration member 15 having a pedestal sectional shape, and voltages having a phase difference of 90° therebetween are applied through lead wires 16 to generate a travelling vibration wave in the vibration member 15 in a known manner. The rotor 17 which has a flange 17a and serves as the movable member is coupled with the rotary tube 6 by a rubber ring 18 and a pin 19. As the rotor 17 is driven by the travelling vibration wave generated in the vibration member 15, the rotary tube 6 is rotated with the movable member 17.

The rotary tube 6 has a V-groove 6a which holes a plurality of balls 20 by a ball receptacle 21 fitted to the stationary tube 3 and a ball retainer engaged with the stationary tube 3 to reduce a frictional resistance of the rotary tube 6 and smoothen the rotation. The vibration member 15 biased by the dish-shaped spring 11 along the optical axis press-contacts to the movable member 17 having the flange 17a, and the movable member 17 is friction-driven by the travelling vibration wave generated by the vibration member 15.

The vibration absorber 13 is made of rubber or felt to prevent mechanical vibration from being transmitted to the stationary tube 3 and also prevent attenuation of vibration on the lower side of the vibration member 15. The washer 12 serves to uniformly transmit the spring force of the dish-shaped spring 11 to the vibration member 15.

Figure 2:
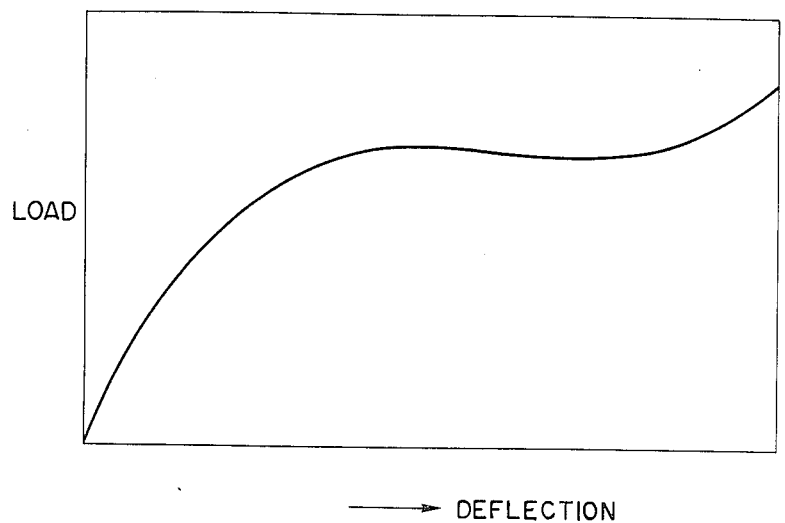
FIG. 2 shows a load-flexure curve of a dished spring used in the vibration wave motor of FIG. 1, FIGS. 3A and 3B show perspective view and sectional view of the dished spring used in the present invention.
Figure 3A:
Figure 4:
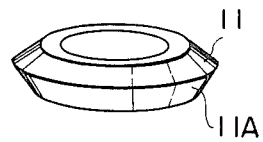
FIG. 4 shows a perspective view of a dished spring used in a second embodiment of the vibration wave motor of the present invention.
Figure 3B:
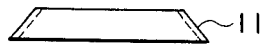

The dish-shaped spring 11 has a wide range of substantially constant pressure (load) for varying flexure, as shown in FIG. 2. Accordingly, even if the dished spring 11 is deformed by aging of expansion and contraction of the vibration absorber 13 or other cause and the flexure of the dish-shaped spring varies, a constant press-contact force is maintained between the vibration member 15 and the movable member 17 and the characteristic of the motor (for example, speed characteristic) does not significantly change under such a circumstance. A plurality of dish-shaped springs may be used in stack as shown in FIG. 4. Thus, they may be used as an initial pressure adjusting member by properly selecting the number of springs.

In accordance with the present invention, the dish-shaped spring is used in order to press-contact the vibration member to the movable member in the vibration wave motor. Accordingly, even if the load to the biasing member suddenly changes and the flexure suddenly changes, the characterisitic of the vibration motor does not significantly change. When more than one dish-shaped springs are used as shown in FIG. 4, the pressure to the vibration member can be adjusted. Thus, the dish-shaped springs may be used as the initial pressure adjusting member.

I claim:

1. A vibration wave motor comprising:
    (a) vibration means having an electro-mechanical energy conversion element, for generating a travelling vibration wave when electrical signals are applied to the conversion element;
    (b) movable member arranged to be frictionally driven by the vibration means; and
    (c) cone-shaped, disc spring means arranged to be in a press-contact relationship between said vibration means and said movable member.

2. A vibration wave motor according to claim 1, wherein said cone-shaped, disc spring means generates a substantially constant pressure over a wide range of the flexure thereof.

3. A vibration wave motor according to claim 1, wherein said cone-shaped, disc spring means includes a plurality of cone-shaped, disc springs.

4. A vibration wave motor according to claim 3, wherein said cone-shaped, disc springs are stacked one on another such that said cone-shaped, disc springs contact one another at an edge surface thereof and an edge surface of one of said cone-shaped, disc springs, which is not in contact with an edge surface of the other cone-shaped, disc springs, and is functionally coupled with an edge of said vibration means.

5. A motorized lens barrel holding a photographic lens, comprising:
    (a) a rotary tube having a helicoid screw;
    (b) a straight tube for holding said lens and having a screw portion engaged with said helicoid screw;
    (c) vibration means having an electro-mechanical energy conversion element, for generating a travelling vibration wave when electrical signals are applied to the conversion element;
    (d) a rotor coupled with said rotary tube for rotating said rotary tube, said rotor being arranged to be frictionally driven by the vibration means; and
    (e) cone-shaped, disc spring means arranged to be in a press-contact relationship between said vibration means and said rotor.

6. A lens barrel according to claim 5, further comprising:
    (a) stationary tube arranged at a predetermined position, said cone-shaped, disc spring means being coupled with said stationary tube.

7. A lens barrel according to claim 5, wherein said cone-shaped, disc spring means includes a plurality of cone-shaped, disc springs.

* * * * *

UNITED STATES PATENT AND TRADEMARK OFFICE
CERTIFICATE OF CORRECTION

PATENT NO. : 4,743,791

DATED : May 10, 1988

INVENTOR(S) : T. KAWAI

It is certified that error appears in the above-identified patent and that said Letters Patent is hereby corrected as shown below:

COLUMN 1

Line 33, "flexuring" should read --flexural--.

COLUMN 2

Line 12, "With" should read --When--.
    Line 25, "tro-strictive" should read --trostrictive--.
    Line 39, "holes" should read --holds--.
    Line 58, "dished" should read --dish-shaped--.

Signed and Sealed this

Twentieth Day of December, 1988

Attest:

DONALD J. QUIGG

*Attesting Officer*    *Commissioner of Patents and Trademarks*